(12) United States Patent
Kim et al.

(10) Patent No.: US 10,911,114 B2
(45) Date of Patent: Feb. 2, 2021

(54) METHOD FOR TRANSMITTING AND RECEIVING A PUSCH AND DMRS BY TERMINAL AND BASE STATION IN WIRELESS COMMUNICATION SYSTEM AND DEVICE SUPPORTING SAME

(71) Applicant: LG Electronics Inc., Seoul (KR)

(72) Inventors: Seonwook Kim, Seoul (KR); Suckchel Yang, Seoul (KR); Kijun Kim, Seoul (KR); Joonkui Ahn, Seoul (KR); Hyukjin Chae, Seoul (KR); Youngtae Kim, Seoul (KR); Seunggye Hwang, Seoul (KR); Seungmin Lee, Seoul (KR); Daesung Hwang, Seoul (KR); Kyuhwan Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/272,763

(22) Filed: Feb. 11, 2019

(65) Prior Publication Data

US 2019/0173546 A1  Jun. 6, 2019

Related U.S. Application Data

(63) Continuation of application No. 16/323,073, filed as application No. PCT/KR2017/008322 on Aug. 2, 2017.

(Continued)

(51) Int. Cl.
*H04B 7/06* (2006.01)
*H04L 5/00* (2006.01)
(Continued)

(52) U.S. Cl.
CPC ......... *H04B 7/0617* (2013.01); *H04B 7/0628* (2013.01); *H04L 5/00* (2013.01);
(Continued)

(58) Field of Classification Search
CPC .. H04B 7/0617; H04B 7/0628; H04B 7/0452; H04W 72/0413; H04W 72/0446;
(Continued)

(56) References Cited

U.S. PATENT DOCUMENTS

| | | | |
|---|---|---|---|
| 2013/0155974 A1* | 6/2013 | Papasakellariou .. | H04W 72/042 370/329 |
| 2013/0182789 A1* | 7/2013 | Ko ...................... | H04B 7/0626 375/267 |

(Continued)

FOREIGN PATENT DOCUMENTS

| | | |
|---|---|---|
| EP | 2925040 A1 | 9/2015 |
| WO | 2015065152 A1 | 5/2015 |
| WO | 2015147445 A1 | 10/2015 |

OTHER PUBLICATIONS

Samsung, "Analog/digital/hybrid beamforming for massive MIMO", 3GPP TSG RAN WG1 #85, May 23-27, 2016, R1-164018.
(Continued)

*Primary Examiner* — Tejis Daya
(74) *Attorney, Agent, or Firm* — Dentons US LLP

(57) ABSTRACT

Disclosed are a method for transmitting and receiving a signal by a terminal and a base station and a device supporting same. More particularly, disclosed are a method for transmitting and receiving a signal by a base station or a terminal by means of applying a beam-forming method which varies for each predetermined resource region, and a device supporting same.

11 Claims, 15 Drawing Sheets

Related U.S. Application Data

(60) Provisional application No. 62/371,241, filed on Aug. 5, 2016, provisional application No. 62/443,777, filed on Jan. 8, 2017, provisional application No. 62/501,068, filed on May 3, 2017.

(51) Int. Cl.
  *H04L 27/26* (2006.01)
  *H04W 72/04* (2009.01)
  *H04B 7/0452* (2017.01)

(52) U.S. Cl.
  CPC ........ *H04L 5/0048* (2013.01); *H04L 27/2607* (2013.01); *H04L 27/2695* (2013.01); *H04W 72/0413* (2013.01); *H04W 72/0446* (2013.01); *H04B 7/0452* (2013.01); *H04L 5/0007* (2013.01)

(58) Field of Classification Search
  CPC ............... H04L 27/2607; H04L 5/0048; H04L 27/2695; H04L 5/0007
  See application file for complete search history.

(56) References Cited

U.S. PATENT DOCUMENTS

| | | | |
|---|---|---|---|
| 2014/0286255 A1 | 9/2014 | Nam et al. | |
| 2014/0293881 A1* | 10/2014 | Khoshnevis | H04L 5/0048 370/329 |
| 2015/0036607 A1* | 2/2015 | Park | H04L 5/0023 370/329 |
| 2015/0327244 A1* | 11/2015 | Pajukoski | H04L 5/0005 370/330 |
| 2017/0041103 A1* | 2/2017 | Maattanen | H04L 1/1671 |
| 2018/0076917 A1* | 3/2018 | Pan | H04B 7/0639 |
| 2018/0110041 A1* | 4/2018 | Bendlin | H04L 5/0007 |
| 2018/0115305 A1* | 4/2018 | Islam | H04B 7/0695 |

OTHER PUBLICATIONS

InterDigital Communications, "Views on Beamforming with a Large Number of Antennas", 3GPP TSG-RAN WG1 Meeting #85, May 23-27, 2016, R1-165062.

Verizon, "Verizon 5G TF; Air Interface Working Group; Verizon 5th Generation Radio Access; Physical channels and modulation (Release 1)", TS V5G.211 V1.3 (Jun. 2016).

* cited by examiner

METHOD FOR TRANSMITTING AND RECEIVING A PUSCH AND DMRS BY TERMINAL AND BASE STATION IN WIRELESS COMMUNICATION SYSTEM AND DEVICE SUPPORTING SAME

This application is a continuation application of U.S. patent application Ser. No. 16/323,073 filed Feb. 4, 2019, which is a National Stage Entry of International Application No. PCT/KR2017/008322 filed Aug. 2, 2017, which claims priority to U.S. Provisional Application Nos. 62/371,241 filed Aug. 5, 2016; 62/443,777 filed Jan. 8, 2017 and 62/501,068 filed May 3, 2017, all of which are incorporated herein by reference.

TECHNICAL FIELD

The following description relates to a wireless communication system, and more particularly, to a method of transmitting and receiving a signal between a user equipment (UE) and a base station (BS) in a wireless communication system, and an apparatus supporting the same.

More specifically, the following description includes a description of a method of transmitting and receiving a signal by applying a different beamforming scheme to each predetermined resource area, performed by a BS or a UE, and an apparatus supporting the same.

Especially, the following description includes a description of a method of transmitting an uplink control channel or an uplink shared channel by applying a different beamforming scheme to each time/frequency resource area according to a predetermined rule, performed by a UE, and an apparatus supporting the same according to the present invention.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, ultra-reliable and low latency communication (URLLC), and the like has been discussed.

DISCLOSURE

Technical Problem

An aspect of the present invention is to provide a method of transmitting and receiving a signal between a user equipment (UE) and a base station (BS) in a new proposed communication system, and an apparatus supporting the same.

Particularly, an aspect of the present invention is to provide a method of transmitting an uplink signal in a precoder cycling scheme which applies a different beamforming scheme to each predetermined resource area by a UE, for efficient transmission of the uplink signal (e.g., control information, data information, etc.) to a BS, and an apparatus supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present invention provides methods and apparatuses for transmitting and receiving a signal by a base station (BS) and a user equipment (UE) in a wireless communication system. Particularly, the present invention provides methods and apparatuses for transmitting an uplink signal to a BS by using a different beamforming scheme (i.e., a different precoder cycling scheme) per predetermined resource area carrying the uplink signal.

In an aspect of the present disclosure, a method of transmitting an uplink signal by a UE in a wireless communication system includes transmitting the uplink signal by applying a different beamforming scheme to each of resource areas divided according to a predetermined rule in one or more symbols of a slot including a plurality of symbols.

In another aspect of the present disclosure, a UE for transmitting an uplink signal to a BS in a wireless communication system includes a transmitter, a receiver, and a processor operatively connected to the transmitter and the receiver. The processor is configured to transmit the uplink signal by applying a different beamforming scheme to each of resource areas divided according to a predetermined rule in one or more symbols of a slot including a plurality of symbols.

Herein, the uplink signal may be a physical uplink control channel (PUCCH) or a physical uplink shared channel (PUSCH).

Further, in the present invention, the application of a different beamforming scheme to each of resource areas divided according to a predetermined rule may mean applying one or more of digital beamforming, analog beamforming, and hybrid beamforming differently to each of the resources areas divided according to the predetermined rule.

In the present invention, if the uplink signal is transmitted in one symbol, the uplink signal may be transmitted by applying a different beamforming scheme to each of the frequency areas divided according to the predetermined rule in the one symbol.

The method may further include receiving information about the predetermined rule from the BS. The information about the predetermined rule may include one of information about the size of frequency resources to which the same beamforming scheme is applied, and information about a range of frequency resources to which the same beamforming scheme is applied.

In the present invention, if the uplink signal is mapped distributedly in the frequency domain within one symbol, the predetermined rule may indicate division of resource areas in which a different beamforming scheme is applied to each set of contiguous frequency resources or each set of contiguous resources of the same comb index in the one symbol carrying the uplink signal.

In the present invention, if the uplink signal is transmitted in two symbols, the predetermined rule may indicate division of resource areas in which a different beamforming scheme is applied to each symbol carrying the uplink signal.

In the present invention, if the uplink signal is transmitted in two symbols, the predetermined rule may indicate division of resource areas in which a different beamforming scheme is applied to each of a symbol including a reference signal (RS) and a symbol without an RS.

In the present invention, if the uplink signal is transmitted in two symbols, the predetermined rule may indicate division of resource areas in which a different beamforming scheme is applied to each frequency resource area of a predetermined size in the two symbols.

In the present invention, if the uplink signal is transmitted in more than two symbols, the predetermined rule may indicate division of resource areas in which a different beamforming scheme is applied to each of a symbol including an RS and a symbol without an RS.

Further, if the uplink signal is transmitted by frequency hopping in more than two symbols, the predetermined rule may indicate division of resource areas in which a different beamforming scheme is applied to each hop in the more than two symbols.

It is to be understood that both the foregoing general description and the following detailed description of the present disclosure are exemplary and explanatory and are intended to provide further explanation of the disclosure as claimed.

Advantageous Effects

As is apparent from the above description, the embodiments of the present invention have the following effects.

According to the present invention, a UE can efficiently transmit an uplink signal to a BS in a new proposed wireless communication system.

Particularly according to the present invention, a UE can efficiently transmit a physical uplink control channel (PUCCH) including a predetermined number of symbols to a BS.

The effects that can be achieved through the embodiments of the present invention are not limited to what has been particularly described hereinabove and other effects which are not described herein can be derived by those skilled in the art from the following detailed description. That is, it should be noted that the effects which are not intended by the present invention can be derived by those skilled in the art from the embodiments of the present invention.

BRIEF DESCRIPTION OF THE DRAWINGS

The accompanying drawings, which are included to provide a further understanding of the invention, provide embodiments of the present invention together with detail explanation. Yet, a technical characteristic of the present invention is not limited to a specific drawing. Characteristics disclosed in each of the drawings are combined with each other to configure a new embodiment. Reference numerals in each drawing correspond to structural elements.

BEST MODE FOR CARRYING OUT THE INVENTION

Figure 1:
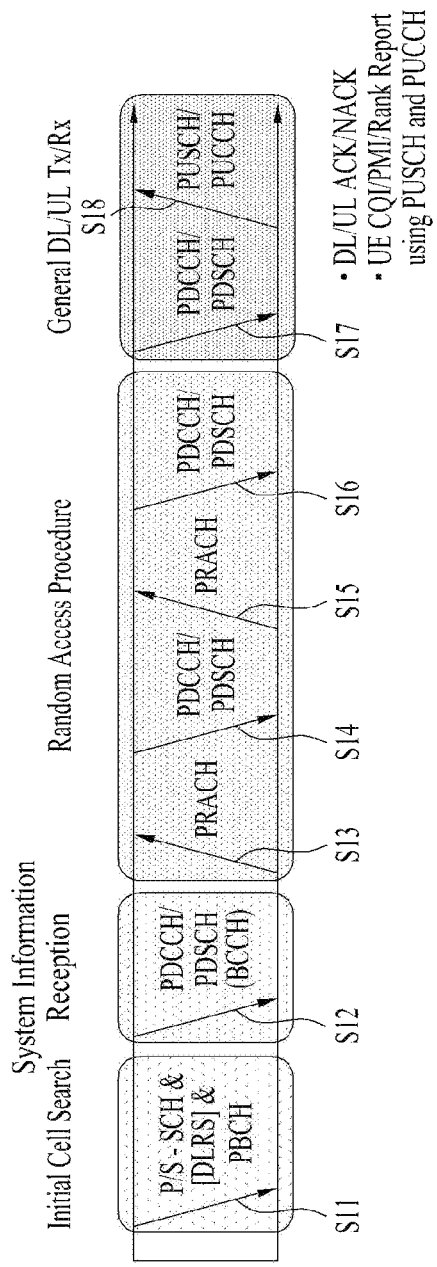
FIG. 1 is a diagram illustrating physical channels and a signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present disclosure, the term terminal may be replaced with a UE, a Mobile Station (MS), a Subscriber Station (SS), a Mobile Subscriber Station (MSS), a mobile terminal, an Advanced Mobile Station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an UpLink (UL). Likewise, the UE may serve as a reception end and the BS may serve as a transmission end, on a DownLink (DL).

The embodiments of the present disclosure may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present disclosure may be supported by the standard specifications, 3GPP TS 36.211, 3GPP TS 36.212, 3GPP TS 36.213, 3GPP TS 36.321 and 3GPP TS 36.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

For example, the term, TxOP may be used interchangeably with transmission period or Reserved Resource Period (RRP) in the same sense. Further, a Listen-Before-Talk (LBT) procedure may be performed for the same purpose as a carrier sensing procedure for determining whether a channel state is idle or busy, CCA (Clear Channel Assessment), CAP (Channel Access Procedure).

Hereinafter, 3GPP LTE/LTE-A systems are explained, which are examples of wireless access systems.

The embodiments of the present disclosure can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present disclosure are described in the context of a 3GPP LTE/LTE-A system in order to clarify the technical features of the present disclosure, the present disclosure is also applicable to an IEEE 802.16e/m system, etc.

1. 3GPP LTE/LTE-A System 1.1 Physical Channels and Method of Transmitting and Receiving Signals on the Physical Channels In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates physical channels and a general signal transmission method using the physical channels, which may be used in embodiments of the present disclosure.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Resource Structure

Figure 2:
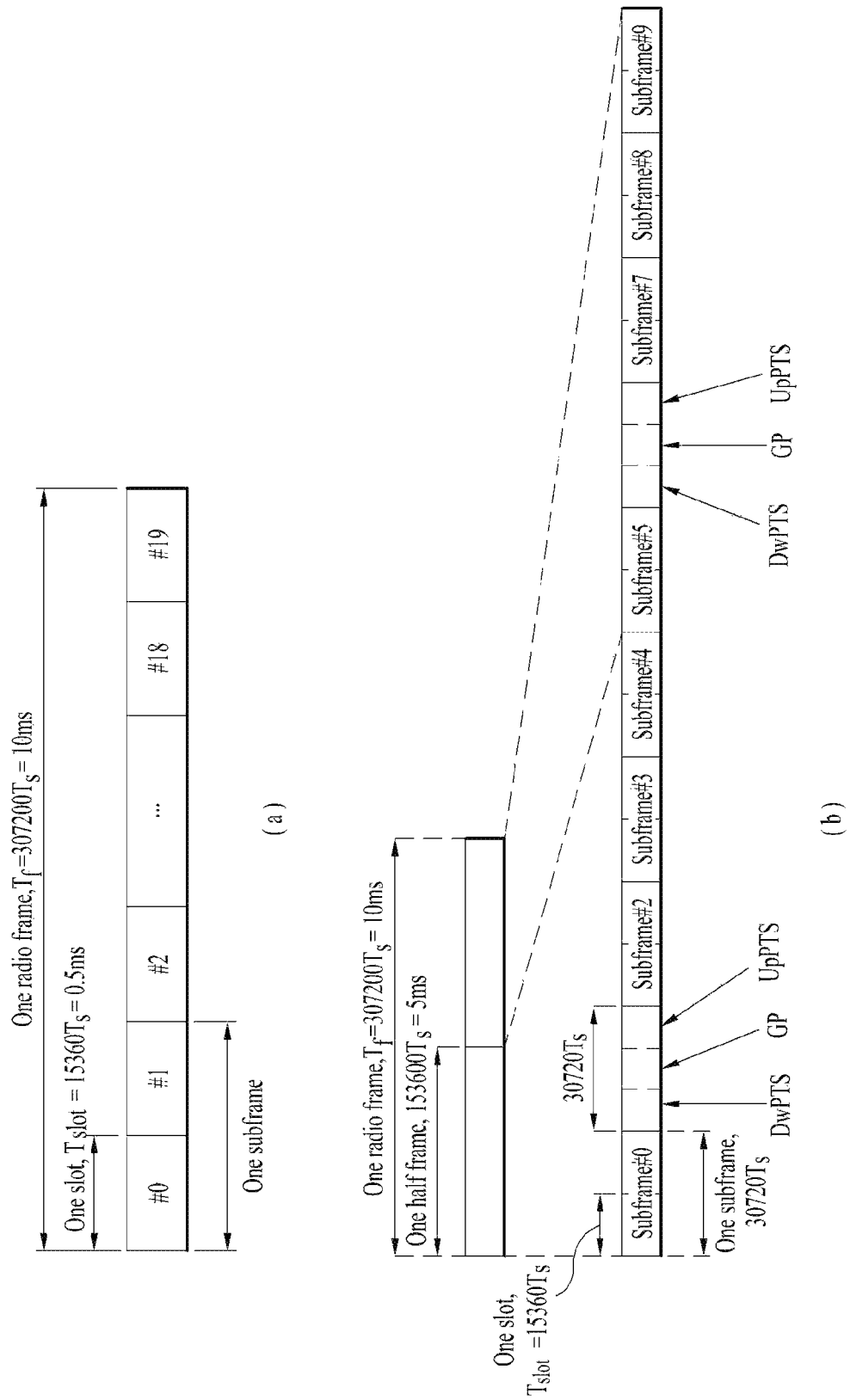
FIG. 2 is a diagram illustrating exemplary radio frame structures.

FIG. 2 illustrates exemplary radio frame structures used in embodiments of the present disclosure.

FIG. 2($a$) illustrates frame structure type 1. Frame structure type 1 is applicable to both a full Frequency Division Duplex (FDD) system and a half FDD system.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2($b$) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10−8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

TABLE 1

| | | Normal cyclic prefix in downlink | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10−8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

Figure 3:
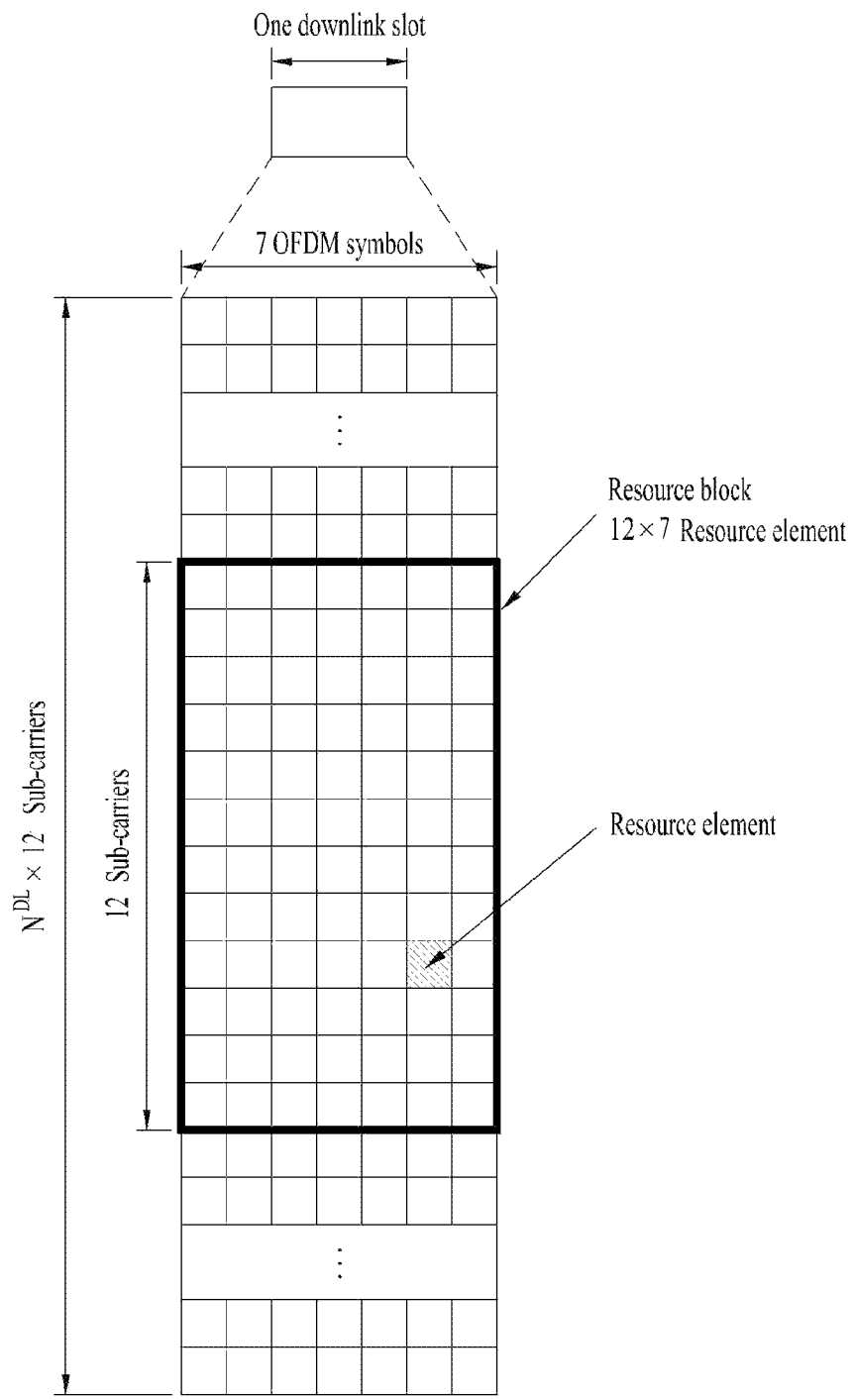
FIG. 3 is a diagram illustrating an exemplary resource grid for the duration of a downlink slot.

FIG. 3 illustrates an exemplary structure of a DL resource grid for the duration of one DL slot, which may be used in embodiments of the present disclosure.

Referring to FIG. 3, a DL slot includes a plurality of OFDM symbols in the time domain. One DL slot includes 7 OFDM symbols in the time domain and an RB includes 12 subcarriers in the frequency domain, to which the present disclosure is not limited.

Each element of the resource grid is referred to as a Resource Element (RE). An RB includes 12×7 REs. The number of RBs in a DL slot, NDL depends on a DL transmission bandwidth. The structure of the uplink slot may be the same as the structure of the downlink slot.

Figure 4:
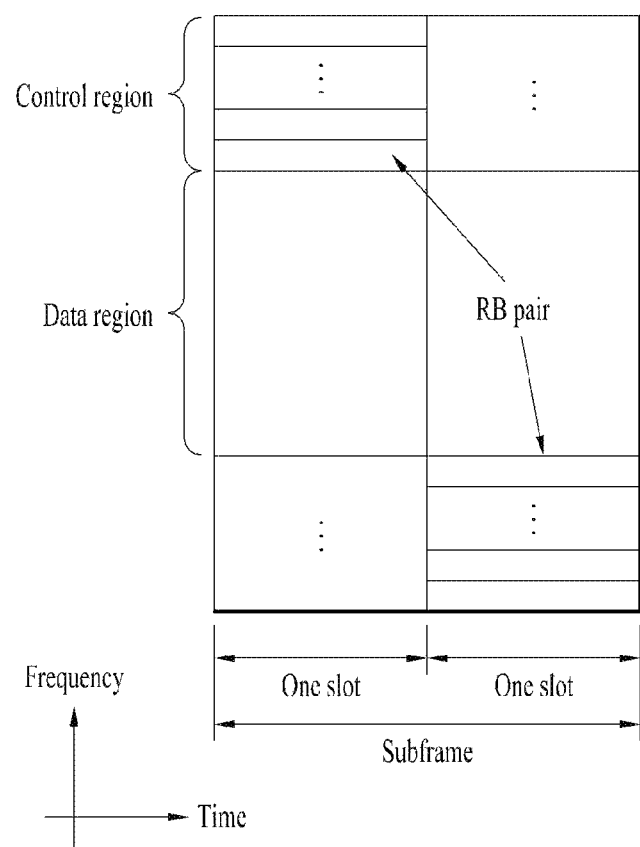
FIG. 4 is a diagram illustrating an exemplary structure of an uplink subframe.

FIG. 4 illustrates a structure of a UL subframe which may be used in embodiments of the present disclosure.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
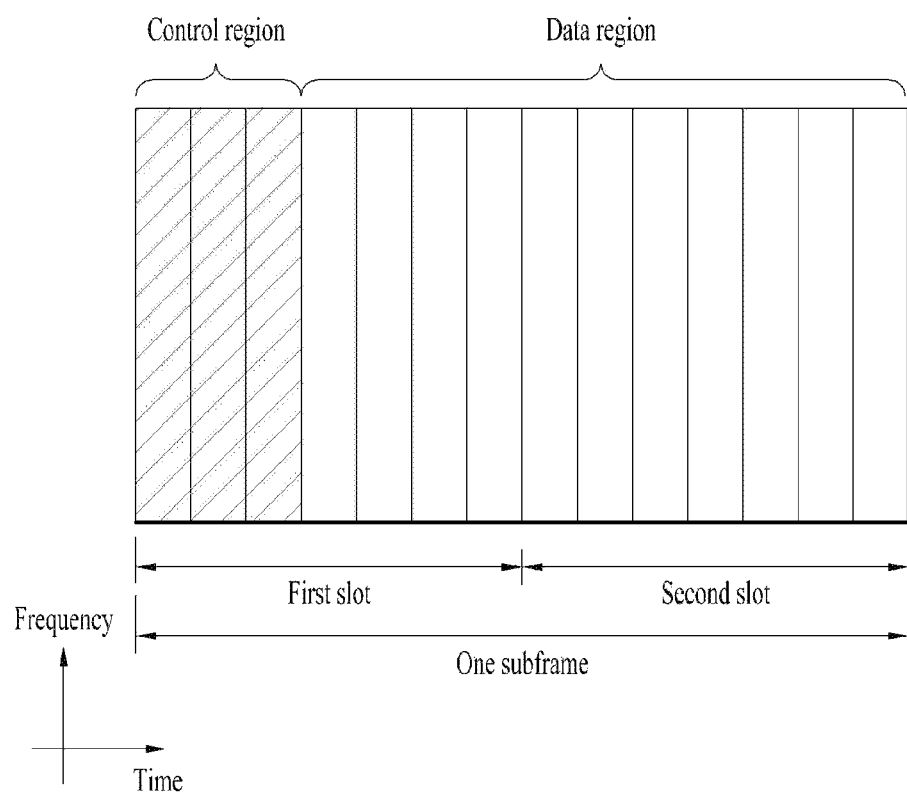
FIG. 5 is a diagram illustrating an exemplary structure of a downlink subframe.

FIG. 5 illustrates a structure of a DL subframe that may be used in embodiments of the present disclosure.

Referring to FIG. 5, up to three 01-DM symbols of a DL subframe, starting from 01-DM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of 01-DM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. New Radio Access Technology System

As more and more communication devices require greater communication capacity, there is a need for mobile broadband communication enhanced over existing radio access technology (RAT). In addition, massive Machine-Type Communications (MTC) capable of providing a variety of services anywhere and anytime by connecting multiple devices and objects is also considered. Communication system design considering services/UEs sensitive to reliability and latency is also under discussion.

Thus, introduction of a new radio access technology considering enhanced mobile broadband communication, massive MTC, and Ultra-Reliable and Low Latency Communication (URLLC) is being discussed. In the present invention, for simplicity, this technology will be referred to as New RAT or NR (New Radio).

2.1. Self-Contained Subframe Structure

Figure 6:
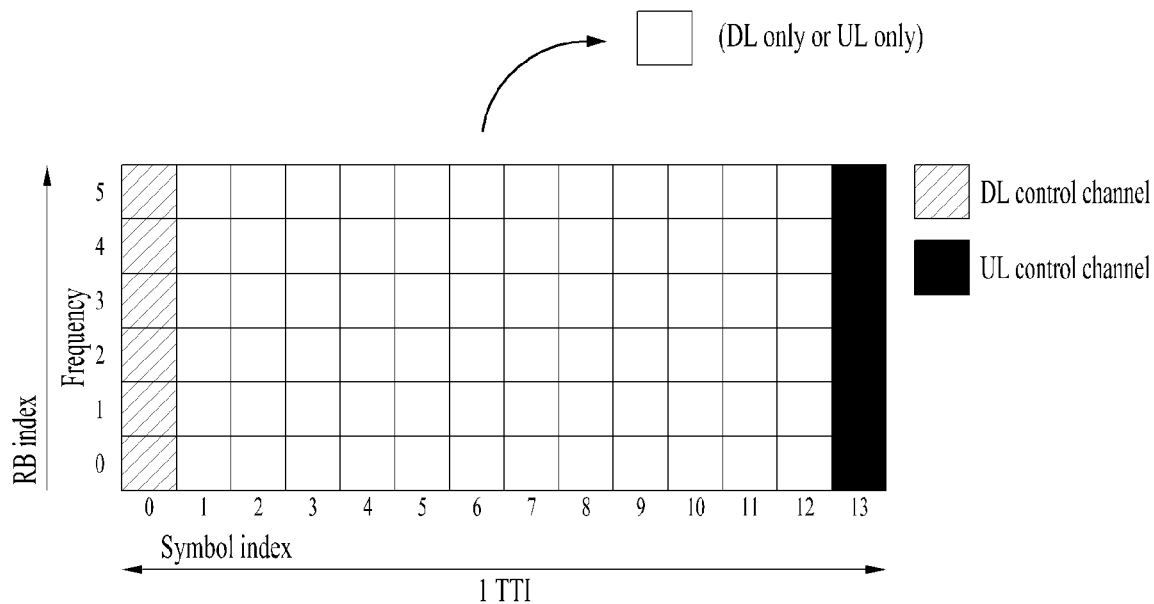
FIG. 6 is a diagram illustrating a self-contained subframe structure applicable to the present invention.

FIG. 6 is a diagram illustrating a self-contained subframe structure applicable to the present invention.

In the NR system to which the present invention is applicable, a self-contained subframe structure as shown in FIG. 6 is proposed in order to minimize data transmission latency in the TDD system.

In FIG. 6, the hatched region (e.g., symbol index=0) represents a downlink control region, and the black region (e.g., symbol index=13) represents an uplink control region. The other region (e.g., symbol index=1 to 12) may be used for downlink data transmission or for uplink data transmission.

In this structure, DL transmission and UL transmission may be sequentially performed in one subframe. In addition, DL data may be transmitted and received in one subframe and UL ACK/NACK therefor may be transmitted and received in the same subframe. As a result, this structure may reduce time taken to retransmit data when a data transmission error occurs, thereby minimizing the latency of final data transmission.

In such a self-contained subframe structure, a time gap having a certain time length is required in order for the base station and the UE to switch from the transmission mode to the reception mode or from the reception mode to the transmission mode. To this end, some OFDM symbols at the time of switching from DL to UL in the self-contained subframe structure may be set as a guard period (GP).

While a case where the self-contained subframe structure includes both the DL control region and the UL control region has been described above, the control regions may be selectively included in the self-contained subframe structure. In other words, the self-contained subframe structure according to the present invention may include not only the case of including both the DL control region and the UL control region but also the case of including either the DL control region or the UL control region alone as shown in FIG. 6.

For simplicity of explanation, the frame structure configured as above is referred to as a subframe, but this configuration can also be referred to as a frame or a slot. For example, in the NR system, one unit consisting of a plurality of symbols may be referred to as a slot. In the following description, a subframe or a frame may be replaced with the slot described above.

2.2. OFDM Numerology

The NR system uses the 01-DM transmission scheme or a similar transmission scheme. Here, the NR system may typically have the OFDM numerology as shown in Table 2.

TABLE 2

| Parameter | Value |
| --- | --- |
| Subcarrier-spacing (Δf) | 75 kHz |
| OFDM symbol length | 13.33 μs |
| Cyclic Prefix(CP) length | 1.04 us/0.94 μs |
| System BW | 100 MHz |
| No. of available subcarriers | 1200 |
| Subframe length | 0.2 ms |
| Number of OFDM symbol per Subframe | 14 symbols |

Alternatively, the NR system may use the OFDM transmission scheme or a similar transmission scheme, and may use an OFDM numerology selected from among multiple OFDM numerologies as shown in Table 3. Specifically, as disclosed in Table 3, the NR system may take the 15 kHz subcarrier-spacing used in the LTE system as a base, and use an OFDM numerology having subcarrier-spacing of 30, 60, and 120 kHz, which are multiples of the 15 kHz subcarrier-spacing.

In this case, the cyclic prefix, the system bandwidth (BW) and the number of available subcarriers disclosed in Table 3 are merely an example that is applicable to the NR system according to the present invention, and the values thereof may vary depending on the implementation method. Typically, for the 60 kHz subcarrier-spacing, the system bandwidth may be set to 100 MHz. In this case, the number of available subcarriers may be greater than 1500 and less than 1666. Also, the subframe length and the number of 01-DM symbols per subframe disclosed in Table 3 are merely an example that is applicable to the NR system according to the present invention, and the values thereof may vary depending on the implementation method.

TABLE 3

| Parameter | Value | Value | Value | Value |
|---|---|---|---|---|
| Subcarrier-spacing (Δf) | 15 kHz | 30 kHz | 60 kHz | 120 kHz |
| OFDM symbol length | 66.66 | 33.33 | 16.66 | 8.33 |
| Cyclic Prefix(CP) length | 5.20 μs/ 4.69 μs | 2.60 μs/ 2.34 μs | 1.30 μs/ 1.17 μs | 0.65 μs/ 0.59 μs |
| System BW | 20 MHz | 40 MHz | 80 MHz | 160 MHz |
| No. of available subcarriers | 1200 | 1200 | 1200 | 1200 |
| Subframe length | 1 ms | 0.5 ms | 0.25 ms | 0.125 ms |
| Number of OFDM symbol per Subframe | 14 symbols | 14 symbols | 14 symbols | 14 symbols |

2.3. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 7:
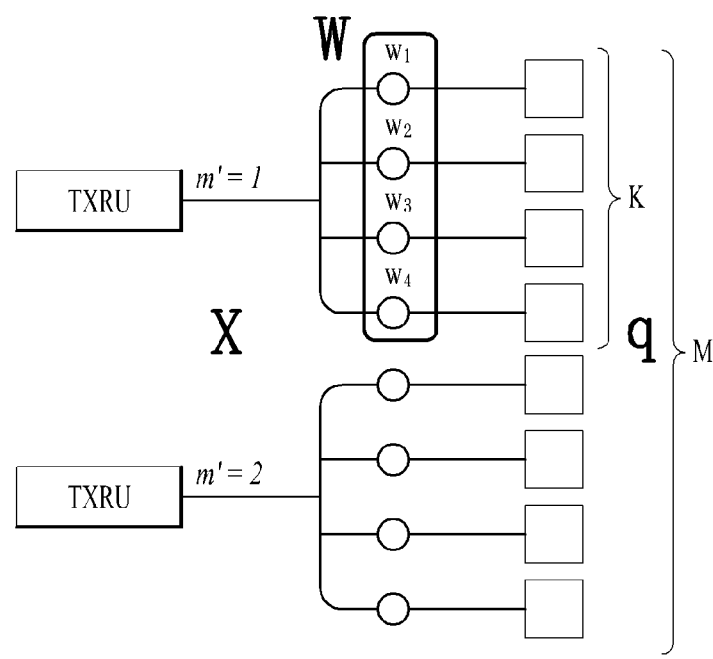
FIGS. 7 and 8 are diagrams illustrating representative methods for connecting TXRUs to antenna elements.
Figure 8:
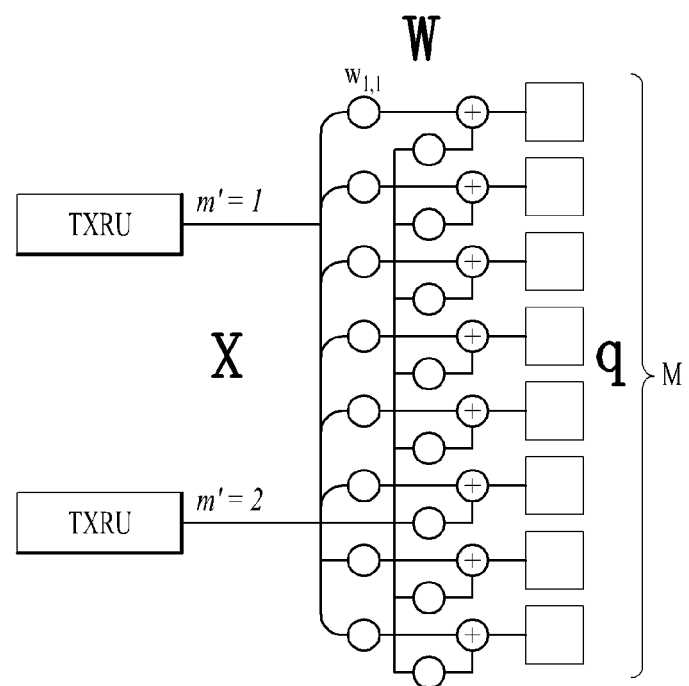

FIGS. 7 and 8 are diagrams illustrating representative methods for connecting TXRUs to antenna elements. Here, the TXRU virtualization model represents the relationship between TXRU output signals and antenna element output signals.

FIG. 7 shows a method for connecting TXRUs to subarrays. In FIG. 7, one antenna element is connected to one TXRU.

Meanwhile, FIG. 8 shows a method for connecting all TXRUs to all antenna elements. In FIG. 8, all antenna element are connected to all TXRUs. In this case, separate addition units are required to connect all antenna elements to all TXRUs as shown in FIG. 8.

In FIGS. 7 and 8, W indicates a phase vector weighted by an analog phase shifter. That is, W is a major parameter determining the direction of the analog beamforming. In this case, the mapping relationship between CSI-RS antenna ports and TXRUs may be 1:1 or 1-to-many.

The configuration shown in FIG. 7 has a disadvantage in that it is difficult to achieve beamforming focusing but has an advantage in that all antennas can be configured at low cost.

On the contrary, the configuration shown in FIG. 8 is advantageous in that beamforming focusing can be easily achieved. However, since all antenna elements are connected to the TXRU, it has a disadvantage of high cost.

3. Proposed Embodiments

Figure 9:
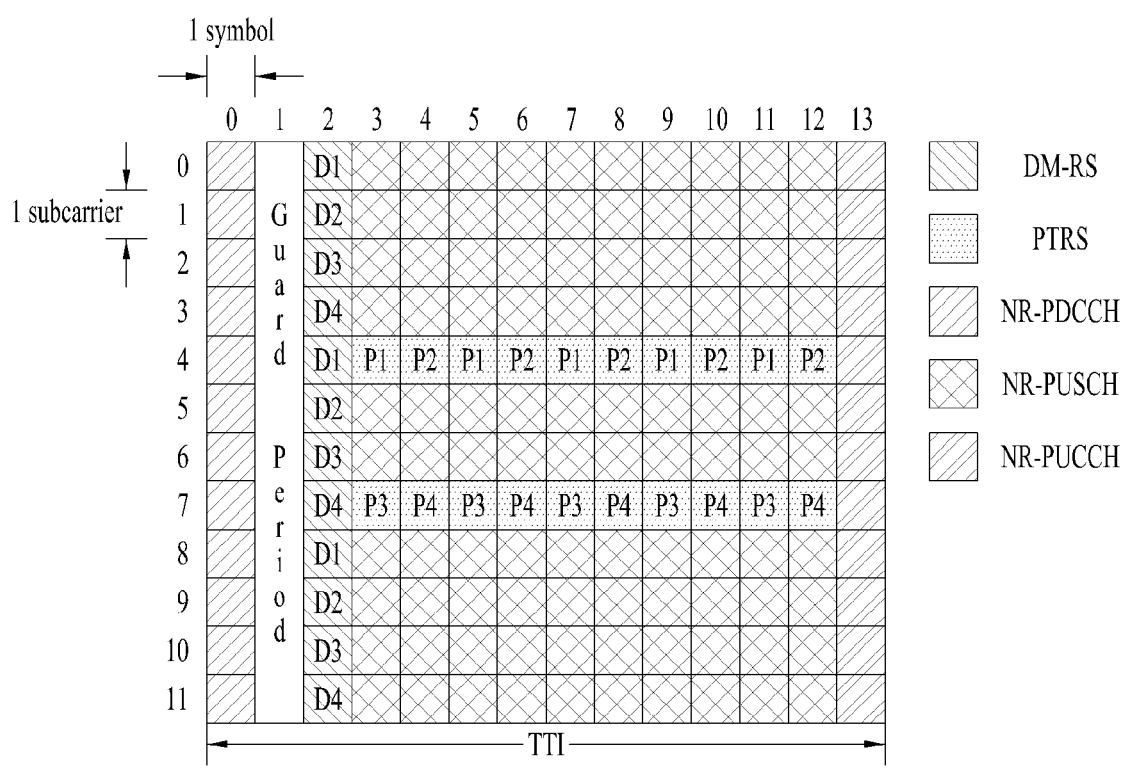
FIG. 9 is a simplified diagram illustrating a frame structure carrying uplink data in a new radio access technology (RAT) (NR) system to which the present invention is applicable.

FIG. 9 is a simplified diagram illustrating a frame structure carrying UL data in a new RAT (NR) system to which the present invention is applicable. A transmission time interval (TTI) may be defined as a minimum time interval during which the medium access control (MAC) layer transmits MAC protocol data units (PDUs) to the physical (PHY) layer. While it is assumed that one TTI includes 14 symbols in FIG. 9, the TTI may be configured to have a longer or shorter time length.

In FIG. 9, a NewRAT physical downlink control channel (NR-PDCCH) refers to a DL control channel carrying DL/UL scheduling information, a NewRAT physical uplink shared channel (NR-PUSCH) refers to a UL channel carrying UL data, and a NewRAT physical uplink control channel (NR-PUCCH) refers to a UL control channel carrying information such as hybrid automatic repeat request-acknowledgement (HARQ-ACK/channel state information (CSI). In addition, a demodulation reference signal (DM-RS) refers to a signal used for channel estimation performed to demodulate the NR-PUSCH.

As illustrated in FIG. 9, each signal/channel may be transmitted in a specific symbol(s), and on a different subcarrier per antenna port (AP). Herein, each signal/channel may be transmitted through up to 4 APs.

A phase noise compensation reference signal (PCRS)/phase tracking reference signal (PTRS) (hereinafter, referred to collectively as a PTRS) refers to a signal transmitted in addition to the DM-RS in order to help with channel estimation in consideration of high mobility or the phase noise of an oscillator. As illustrated in FIG. 9, the PTRS may be configured to be transmitted on a specific subcarrier(s), and in a different symbol/on a different subcarrier per AP. While configurations applicable to the present invention are proposed on the basis of the basic frame structure illustrated in FIG. 9 for the convenience of description, those skilled in the art will clearly understand that the configurations are also applicable to frame structures which differ from the frame structure of FIG. 9 in terms of the transmission resource areas and positions of an NR-PDCCH, a guard period, an NR-PUSCH, an NR-PUCCH, a PTRS, and a DM-RS.

Hereinbelow, methods of transmitting an NR-PUSCH in transmit diversity, methods of transmitting an NR-PUCCH in transmit diversity, methods of multiplexing a DM-RS/PCRS with an NR-PUSCH, and so on will be proposed on the basis of the above-described frame structure.

3.1. NR-PUSCH Transmit Diversity (TxD)

As a DL transmission method using a plurality of APs, the legacy LTE(-A) system supports both of a TxD-based method and a spatial multiplexing (SM)-based method. However, the legacy LTE(-A) system supports only an SM-based method for UL transmission.

In consideration of a larger number of APs of a UE than that of a legacy LTE UE, supported by an NR system to which the present invention is applicable, transmission of UL data for which it is important to guarantee reliability, or coverage expansion of cell-edge UEs, the NR system may also support a TxD transmission method for UL transmission.

Accordingly, a detailed description will be given of a method of indicating TxD transmission of an NR-PUSCH to a UE, and a method of transmitting an NR-PUSCH in TxD in this section.

The following description is given of a related configuration, focusing on the NR-PUSCH, with the appreciation that the TxD indicating method and the TxD transmission method are also applicable in the same manner to other channels. For example, TxD for the NR-PDSCH/NR-PUSCH may be indicated by a DL grant in methods proposed in section 3.1.1 below. In another example, the TxD transmission method is also applicable in the same manner to the NR-PDCCH/NR-PDSCH/NR-PUCCH.

3.1.1. TxD Indication Methods (1) Method of Indicating TxD by DCI (or Physical-Layer Signaling)

Preferably, it may be indicated dynamically whether to transmit UL data in a TxD transmission method or an SM transmission method according to the channel state of a UE or the service type of the UL data.

For example, information indicating TxD may be jointly encoded with scheduling information indicating a precoding matrix used for SM. Specifically, a new generation Node B (gNB) may indicate TxD by some state of a field in DCI indicating a precoding matrix (or a codebook index) and the number of layers. Additionally, the gNB may indicate how many APs/layers or which APs are used for TxD by an additional field or another state of the above-described field.

For the convenience of description, a BS operating in the NR system according to the present invention is referred to as a gNB, distinguishably from an eNB which is an exemplary LTE BS. However, the term gNB may be replaced with eNB depending on an implementation example.

In another example, the gNB may differentiate DCI formats for TxD transmission and SM transmission, and accordingly indicate TxD or SM to a UE by a DCI format indicator.

(2) Method of Indicating TxD by Higher-Layer Signaling (e.g. RRC Signaling)

If the channel state of a UE does not fluctuate or the quality of service (QoS) level of UL data that the UE transmits is similar during a predetermined time, the gNB may semi-statically indicate TxD or SM by RRC signaling.

3.1.2. TxD Transmission Method (Other than SFBC (Space Frequency Block Code))

The legacy LTE system adopts SFBC as a TxD transmission method for DL transmission. This method is designed so as to achieve an optimum diversity gain for 2Tx1Rx (i.e., 2 Txs and 1 Rx). For more than 2 APs at a transmission node, it is difficult to maximize the diversity gain with the method. Especially, considering that the number of APs at an NR UE supported by the NR system to which the present invention is applicable may be larger than 2, the present invention proposes a TxD transmission method to increase the diversity gain of UL transmission.

First, the basic idea of the present invention is to achieve a spatial-domain multiplexing gain by multiplying a signal by a (quasi-)orthogonal sequence per AP, prior to transmission. An orthogonal sequence of length k (k is the number of transmission APs) is multiplied across (non-)contiguous k resources along the frequency axis (or the time axis), and the same modulated symbol is repeatedly transmitted in the k resources.

Figure 10:
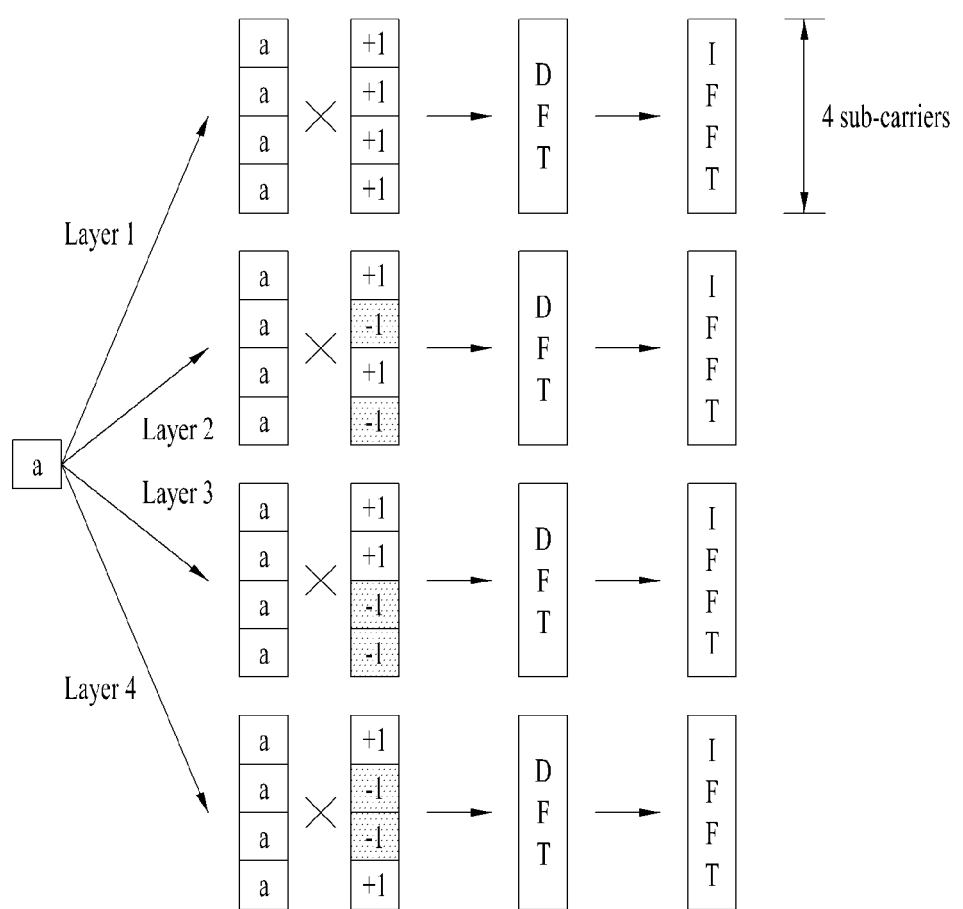
FIG. 10 is a simplified diagram illustrating a transmission diversity (TxD) transmission method according to an example of the present invention.

FIG. 10 is a simplified diagram illustrating a TxD transmission method according to an example of the present invention.

As illustrated in FIG. 10, for example, a TxD method with 4 APs may be used as a UL signal transmission method. Since a UL signal is transmitted through the 4 APs, the same modulated symbol (e.g., "a" in FIG. 10) is repeatedly mapped to 4 subcarriers, and a length-4 orthogonal sequence (e.g., Hadamard sequence) is multiplied by the symbols on the subcarriers, for each AP (or layer). To guarantee the single carrier-frequency division multiplexing (SC-FDM) property, this process needs to be performed before discrete Fourier transform (DFT). If OFDM is adopted for UL transmission, the process may be performed before or after inverse fast Fourier transform (IFFT). While examples of using 4 subcarriers are presented for the illustrative purpose in the above description, the configuration of the present invention may be extended to a case in which UL data is transmitted on more subcarriers. In this case, subcarriers may be grouped into groups each including 4 subcarriers, and an operation of the present invention may be performed in units of 4 subcarriers.

In FIG. 10, when an NR-PUSCH is transmitted in a 4-AP TxD method, 4 subcarriers may form one transmission group. If a PTRS is transmitted on a specific subcarrier(s), it may be difficult to group subcarriers by fours.

Regarding N (N<4) subcarriers excluded from grouping, a symbol may be transmitted repeatedly on the N subcarriers in the same manner as N APs transmit signals in TxD, and a length-N orthogonal sequence may be multiplied by the symbols. For example, if the PTRS is transmitted in the manner illustrated in FIG. 9, subcarriers #0, #1, #2 and #3, and subcarriers #8, #9, #10 and #11 are grouped respectively, with subcarriers #5 and #6 paired. Then, a signal may be transmitted on subcarriers #5 and #6 in TxD only through two APs, AP #1 and AP #2.

The above description may further be extended such that when a length-k orthogonal sequence (k is the number of transmission APs) is multiplied across (non-) contiguous k resources on the frequency axis (or the time axis), the same modulated symbol may be repeatedly transmitted in the k resources, or k or fewer modulated symbols may be transmitted in the k resources. For example, in the example of FIG. 10, a modulated symbol "a" may be repeatedly transmitted in layers #1 and #2, whereas a modulation symbol "b" may be repeatedly transmitted in layers #3 and #4.

Unlike the above method, when a length-k orthogonal sequence is multiplied across (non-)contiguous k resources on the frequency axis (or the time axis), k may be larger than the number of transmission APs. In this case, the same modulated symbol may be repeatedly transmitted or different modulated symbols may be transmitted in code division multiplexing (CDM), in a specific layer.

Characteristically, the afore-proposed various TxD methods and TxD methods proposed in section 3.1.3 below may be configured differently according to modulation orders, modulation and coding schemes (MCSs), use cases/services, or the like. For example, in this section, as the modulation order increases, a peak-to-average power ratio (PAPR) also increases. Thus, a TxD method simply using a codebook of an identity matrix may be applied for an MCS equal to or larger than a predetermined value. In another example, as the modulation order increases, a TxD method with a smaller repetition number may be applied in this section.

3.1.3. TxD Transmission Methods Using SFBC

In the legacy LTE system, a TxD method for DL transmission is implemented in SFBC. Particularly, SFBC-based Tx transmission methods are defined for 2 APs/layers, and 4 APs/layers in the LTE system.

Figure 11:
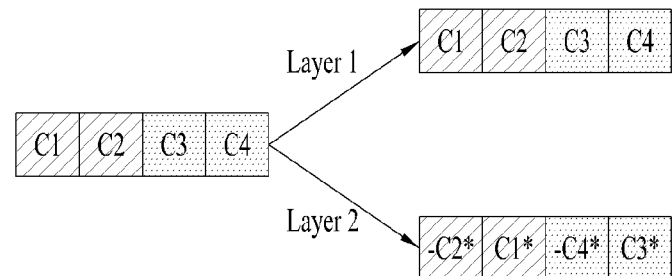
FIG. 11 is a simplified diagram illustrating a TxD method in the case of 2 antenna ports (APs)/layers used for a downlink transmission in a legacy long term evolution (LTE) system.
Figure 12:
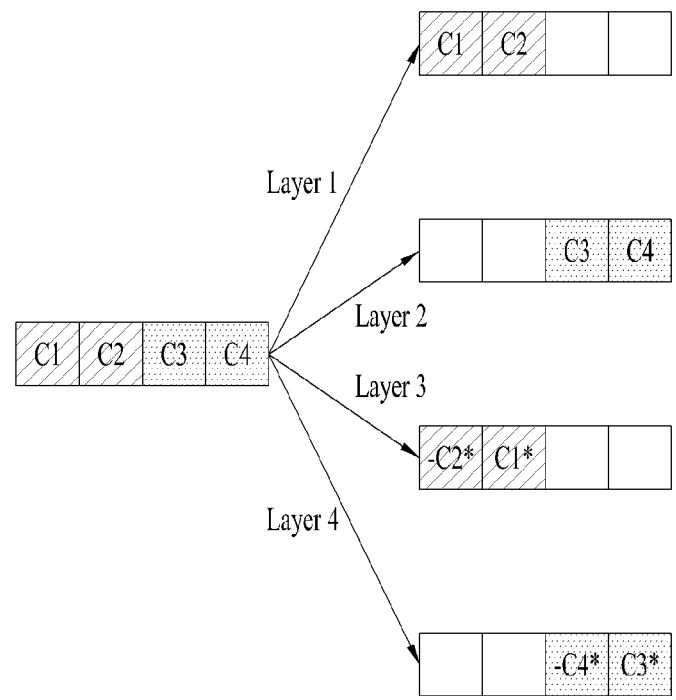
FIG. 12 is a simplified diagram illustrating a TxD method in the case of 4 APs/layers used for a downlink transmission in the legacy LTE system.

FIG. 11 is a simplified diagram illustrating a TxD method in the case of 2 APs/layers for DL transmission in the legacy LTE system, and FIG. 12 is a simplified diagram illustrating a TxD method in the case of 4 APs/layers for DL transmission in the legacy LTE system.

As illustrated in FIG. 11, in the case of 2 APs/layers, for 4 modulated symbols {C1, C2, C3, C4} mapped to 4 respective subcarriers, every two adjacent ones of the 4 subcarriers are paired and SFBC is applied to each of the pairs. As illustrated in FIG. 12, in the case of 4 APs/layers, SFBC is applied to a {C1, C2} pair through APs #1 and #3, and SFBC is applied to a {C3, C4} pair through APs #2 and #4.

3.1.3.1. Method 1

If the method illustrated in FIG. 11 is applied to UL transmission, the PAPR performance of layer 1 may be same in consideration of SC-FDM. However, for layer 2, the single carrier property is not maintained, thereby degrading PAPR performance. In this section, a method of overcoming the problem is proposed.

The basic idea proposed in this section is that when subcarriers are paired, non-contiguous subcarriers are paired, instead of contiguous subcarriers.

Figure 13:
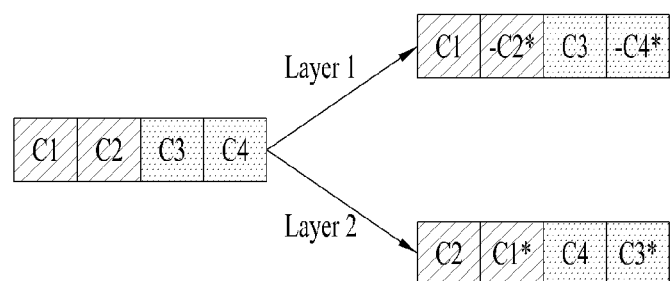
FIGS. 13 and 14 are simplified diagrams illustrating space frequency block coding (SFBC)-based TxD transmission methods using according to an example of the present invention.
Figure 14:
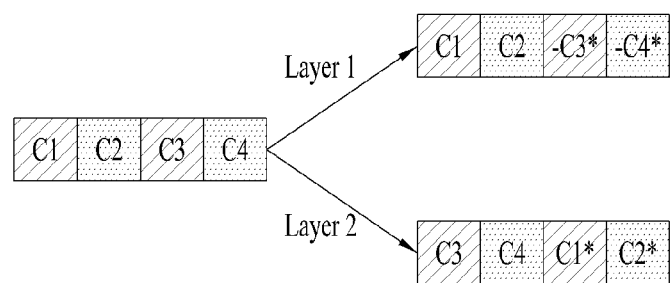

FIGS. 13 and 14 are simplified diagrams illustrating SFBC-based TxD transmission methods according to an example of the present invention.

FIG. 13 illustrates an SFBC scheme applied to the above first example. According to the first example, as illustrated in FIG. 13, when two paired symbols are mapped in each of layers, the pair is mapped with one of the symbols "conjugated" in one of the layers, while the two symbols are swapped in position, with the other symbol "conjugated" in the other layer.

As such, SFBC is applied as illustrated in FIG. 13 in the SFBC-based TxD transmission method according to the first example of the present invention. Further, as illustrated in FIG. 14, with {C1, C3} and {C2, C4} paired respectively, SFBC may be applied on a pair basis. In this manner, every two of symbols, which are apart from each other by a subcarrier spacing of M subcarriers, may be paired and subjected to SFBC. M may be set by physical-layer signaling or higher-layer signaling. The above method is also applicable in the same manner to a case of more than 2 APs/layers.

3.1.3.2. Method 2

Meanwhile, the mapping relationship between a coded bit stream and APs/layers is fixed for DL, so it is not to be changed on the time/frequency axis in the legacy LTE system. This configuration may advantageously increase a diversity gain by permuting the mapping relationship on the time/frequency axis.

Figure 15:
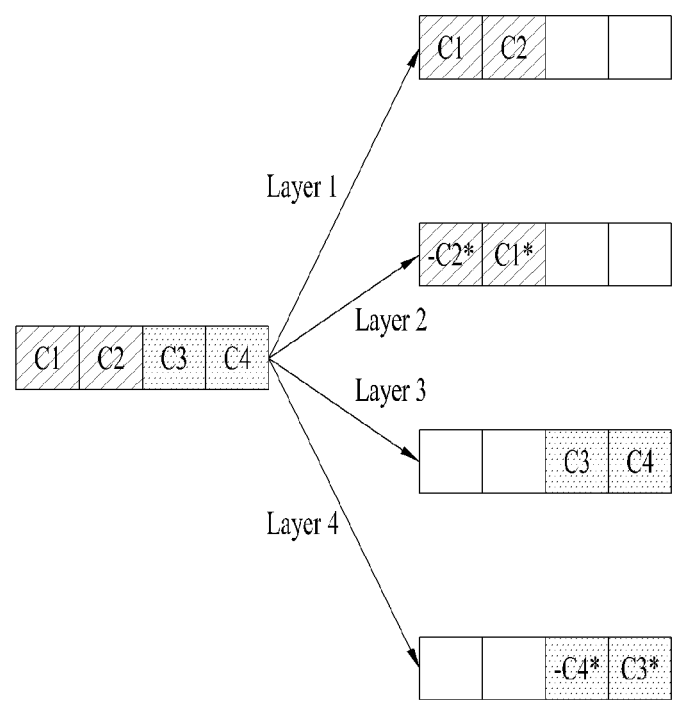
FIG. 15 is a simplified diagram illustrating an SFBC-based TxD transmission method according to another example of the present invention.

FIG. 15 is a simplified diagram illustrating an SFBC-based TxD transmission method according to another example of the present invention.

As illustrated in FIG. 15, SFBC may be applied to a {C1, C2} pair through APs #1 and #2, while SFBC may be applied to a {C3, C4} pair through APs #3 and #4.

Additionally, both of the SFBC method illustrated in FIG. 15 and the SFBC method illustrated in FIG. 12 may be applied in the present invention. Each of the SFBC methods may be performed in a predetermined rule or a rule indicated by physical-layer signaling or higher-layer signaling.

For example, the SFBC method illustrated in FIG. 15 may be applied to even-numbered symbols, while the SFBC method illustrated in FIG. 12 may be applied to odd-numbered symbols.

In another example, the SFBC method illustrated in FIG. 15 and the SFBC method illustrated in FIG. 12 may be applied alternately every four subcarriers in an allocated frequency resource area within the same symbol. Additionally, aside from the afore-described two SFBC methods, various combinations of mapping methods are available for mapping the {C1, C2} pair and the {C3, C4} pair to APs.

3.1.3.3. Method 3

The proposed TxD transmission methods have been described in section 3.1.3.1. and section 3.1.3.2. with the appreciation that SFBC is applied only on the frequency axis. However, the TxD transmission methods applicable to the present invention may be extended to TxD transmission methods in which SFC is applied on the time and frequency axes in combination.

Figure 16:
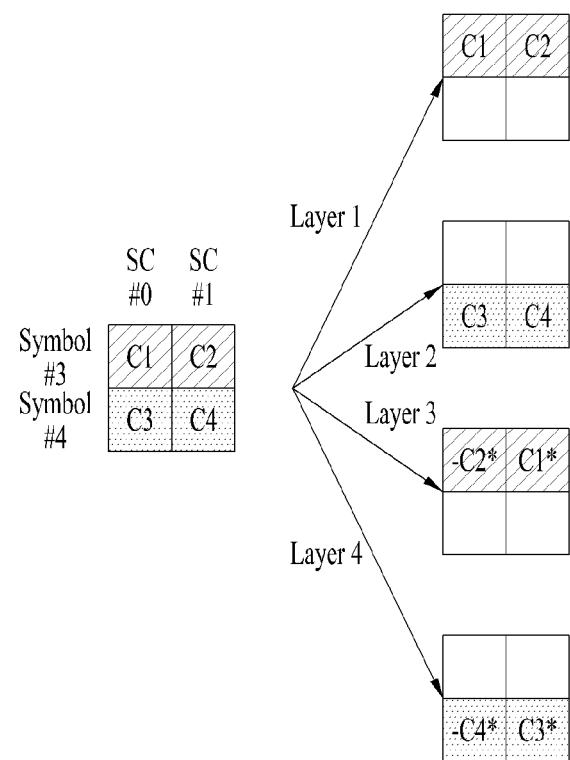
FIG. 16 is a simplified diagram illustrating an SFBC-based TxD transmission method according to another example of the present invention.

FIG. 16 is a simplified diagram illustrating an SFBC-based TxD transmission method according to another example of the present invention.

For example, as illustrated in FIG. 16, while only APs #1 and #3 are selected and SFBC is applied to a pair of {C1, C2} in symbol #3, while only APs #2 and #4 are selected and SFBC is applied to a pair of {C3, C4} in symbol #4.

Additionally, Method 3 is advantageous in that a resource area used for PTRS transmission may be reduced.

Figure 17:
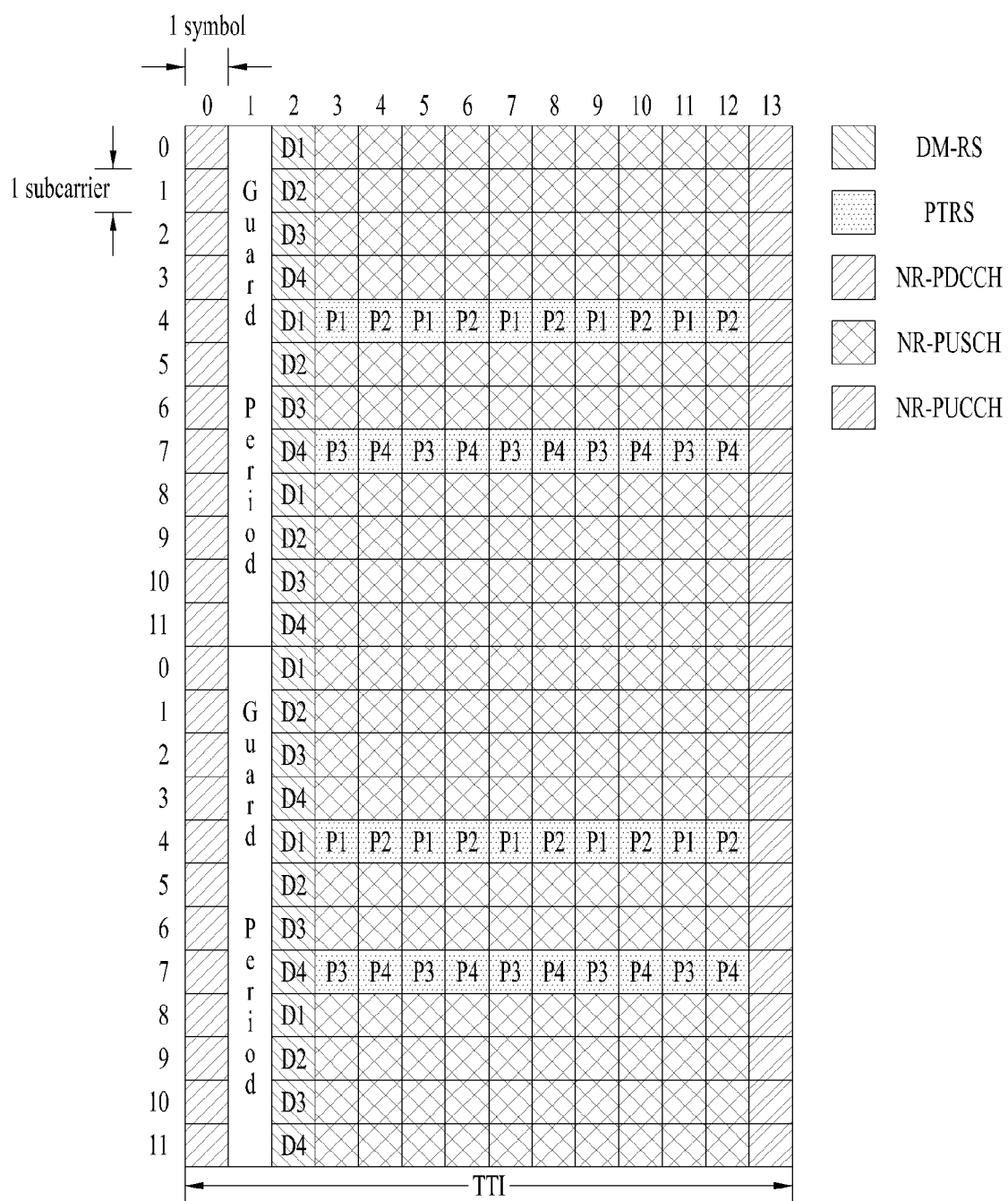
FIG. 17 is a simplified diagram illustrating a configuration for transmitting a phase tracking reference signal (PTRS) on one subcarrier per PTRS AP according to an example of the present invention.

FIG. 17 is a simplified diagram illustrating a configuration for transmitting a PTRS on one subcarrier per PTRS AP according to an example of the present invention.

As illustrated in FIG. 17, if a PTRS is transmitted on one (or more) subcarriers per PTRS AP, there is no need for transmitting PTRSs of all PTRS APs in one symbol in the case of TxD using only APs #1 and #3 or APs #2 and #4 in one symbol as illustrated in FIG. 16. In other words, a PTRS may be transmitted in symbol #3 only through APs #1 and #3, while a PTRS may be transmitted in symbol #4 only through APs #2 and #4.

Characteristically, a specific transmission method (e.g., PTRS AP mapping, the number of transmission subcarriers, etc.) may be changed depending on whether a PTRS is transmitted in SM or TxD. For example, when a gNB transmits the PTRS in SM (or through a single AP), the gNB may transmit the PTRS in the manner illustrated in FIG. 17, and when the gNB transmits the PTRS in TxD, the gNB may transmit the PTRS in the manner illustrated in FIG. 9.

Further, if the PTRS is transmitted in the TxD method proposed in this section, PTRS APs that transmit the PTRS in each symbol may be determined according to APs that actually attempt data transmission in the symbol. For example, if SFBC is applied to APs #1 and #3 for data transmission, the PTRS may also be transmitted through APs #1 and #3.

On the contrary, if PTRS-AP mapping is preset for a specific resource area as illustrated in FIG. 9, SFBC may be applied to each symbol by using two predetermined APs. In a more specific example, if the PTRS is configured to be transmitted in a specific symbol through APs #1 and #3, SFBC may also be applied to data transmitted in the symbol by using only APs #1 and #3.

In the TxD method proposed in this section, it may be configured that each modulated symbol is transmitted through all APs.

For example, it may be configured that the {C3, C4} pair is replaced with the {C1, C2} pair, and thus the {C1, C2} pair is transmitted through all APs in FIG. 12.

In another example, it may be configured that the {C3, C4} pair is replaced with the {C1, C2} pair, and thus the {C1, C2} pair is transmitted through all APs in FIG. 16.

In another example, it may be configured that the {C3, C4} pair is replaced with the {C1, C2} pair, and the {C1, C2} pair is transmitted through all APs in FIG. 16.

3.2. NR-PUCCH Transmit Diversity (TxD)

In the NR system to which the present invention is applicable, a new PUCCH may be defined to carry UCI including an HARQ-ACK and/or CSI and/or beam-related information and/or scheduling request (SR)-related information. For the convenience of description, the new proposed PUCCH will be referred to as an NR-PUCCH.

The NR-PUCCH may include a relatively short PUCCH including one or two symbols (referred to as a 1-symbol PUCCH or a 2-symbol PUCCH), or a relatively long PUCCH including 4 or more symbols (referred to as a long PUCCH) in a slot with 14 (or 7) symbols.

In this section, a precoder cycling-based TxD method for each of the NR-PUCCHs will be described in detail. Precoder cycling may mean that a different one of digital beamforming, analog beamforming, and hybrid beamforming is performed on a predetermined time or frequency area basis. Further, the precoder cycling may include antenna switching and/or panel switching.

While a configuration of the present invention will be described below, focusing on the NR-PUCCH, the TxD transmission method proposed by the present invention may also be applied in the same manner to other channels (e.g., NR-PDCCH, NR-PDSCH, and NR-PUSCH).

3.2.1. 1-Symbol PUCCH TxD Method

To transmit a 1-symbol PUCCH in TxD, it may be configured that the same precoding/beamforming is applied on a specific frequency unit (e.g., RE group or RB group) basis.

For example, different precoding/beamforming may be applied to a 1-symbol PUCCH having 10 RBs every 5 RBs (preset or configured by L1 signaling or higher-layer signaling).

In another example, when the 1-symbol PUCCH is subjected to distributed mapping, but localized mapping, the same precoding/beamforming may be configured for (or applied to) the 1-symbol PUCCH, only within contiguous frequency resources (or contiguous resources of the same comb index).

In another example, precoding/beamforming applied to a specific frequency unit may be determined by an actually mapped frequency-domain resource index irrespective of the amount of allocated frequency resources. In a specific example, if a 100-RB band is divided into frequency bands each having 10 RBs, the same precoding/beamforming may be applied only to frequency resources within the same frequency band in the allocated 1-symbol PUCCH.

In another example, if both of an RS and UCI are included in the single symbol, the same precoding/beamforming may be configured for (or applied to) a frequency area in which the RS includes a predetermined number of or more REs (preset or configured by L1 signaling or higher-layer signaling).

Meanwhile, if an RS and/or UCI are sequences, a sequence as long as the number of corresponding REs may be generated in a frequency area to which the same precoding/beamforming is applied.

The method described above in this section may be applied commonly to a PUCCH structure with an RS and UCI multiplexed in frequency division multiplexing (FDM), and a PUCCH structure transmitted without an RS by sequence selection.

3.2.2. 2-Symbol PUCCH TxD Method

For example, if the 2-symbol PUCCH structure is an extension of the afore-described 1-symbol PUCCH structure, a 2-symbol PUCCH may be transmitted by applying the foregoing 1-symbol PUCCH TxD method to each symbol.

In another example, the same or different precoding/beamforming may be applied to two symbols. Particularly, a configuration of applying the same precoding/beamforming to two symbols may be applied to a case in which the first and second symbols have the same frequency resource area or a case in which one of the two symbols does not carry an RS, and the other symbol includes an RS.

Herein, whether to apply time-axis or frequency-axis precoding/beamforming is configurable. For example, with the same precoding/beamforming on the time axis, the foregoing 1-symbol PUCCH TxD method may be applied to each symbol, with the same precoding/beamforming on the frequency axis, different precoding/beamforming may be applied to each symbol, or with different precoding/beamforming on the time axis, the foregoing 1-symbol PUCCH TxD method may be applied to each symbol.

The method described above in this section may be applied commonly to the PUCCH structure with an RS and UCI multiplexed in FDM, and the PUCCH structure transmitted without an RS by sequence selection.

3.2.3. Long PUCCH TxD Method

According to the present invention, no symbol may include an RS in a long PUCCH in consideration of RS overhead. Accordingly, precoding/beamforming may be applied in a different manner in consideration of a symbol with an RS. Herein, as an RS and UCI are multiplexed in time division multiplexing (TDM), there may be a symbol with the RS only and a symbol with the UCI only.

For example, when frequency hopping is performed to achieve a frequency diversity gain, different precoding/beamforming may be applied per hop.

In another example, different precoding/beamforming may be applied to each group of symbols carrying an RS. In a specific example, in the presence of a plurality of RS symbols in one hop, different precoding/beamforming may be applied even within the one hop. If symbols are allocated in the order of UCI, RS, RS, and UCI in one hop including four symbols, different precoding/beamforming may be applied between the first two symbols and between the last two symbols. In this case, as different precoders are used, an OCC may not be applied between symbols over which a precoder is changed within the same hop.

In another example, different precoding/beamforming may be applied to a multi-slot long PUCCH on a slot or slot group basis (preset or configured by L1 signaling or higher-layer signaling).

As an exemplary method of including UCI in each frequency/time resource to which a different precoder is applied, the same coded bit may be repeatedly included or coded bits are distributedly included in the foregoing 1-symbol PUCCH TxD method, 2-symbol PUCCH TxD method, and long PUCCH TxD method.

Meanwhile, only when a predetermined number of or more ports are configured for PUCCH transmission (e.g., 4 ports are configured for PUCCH transmission), the foregoing precoder cycling-based 1-symbol PUCCH TxD method, 2-symbol PUCCH TxD method, and long PUCCH TxD method may be applied.

For example, a TxD method such as 2-port space frequency block code (SFBC)/space time block code (STBC) may be applied to a PUCCH, and a different precoder may be applied to each predefined frequency/time resource set by using a different AP pair. In a more specific example, when APs #1 and #2, and APs #3 and #4 are paired respectively, a UE may apply SFBC to APs #1 and #2, and also to APs #3 and #4. When the UE transmits a 2-symbol PUCCH, the UE may transmit the PUCCH in the first symbol through APs #1 and #2, and in the second symbol through APs #3 and #4, thereby separating the AP pairs from each other in the time domain.

3.3. UL RS and NR-PUSCH Transmission Method

In FIG. 9, APs used actually for NR-PUSCH transmission and the positions of subcarriers carrying DM-RSs may be predetermined or preset.

For example, regarding APs of each UE, the same AP numbers may be assigned for an RS such as SRS/DM-RS (/PTRS) (e.g., for 4 APs, port numbers are assigned 1, 2, 3 and 4). In this case, it may be configured that the SRS is transmitted through as many APs as the number of APs reported by the UE. If the UE reports 4 APs, an SRS transmission may be configured for APs #1, #2, #3, and #4.

Further, a resource to carry an RS sequence corresponding to an AP number may be preset. In FIG. 9, a DM-RS and a PCRS may be transmitted respectively in D1 and P1 through AP #1. Likewise, the DM-RS and the PTRS may be transmitted respectively in D2 and P2 through AP #2, in D3 and P3 through AP #3, and in D4 and P4 through AP #4.

Herein, if only an AP used actually for NR-PUSCH transmission is indicated to the UE during UL scheduling, the UE may attempt to transmit the DM-RS/PUSCH(/PTRS) by selecting only the AP. Herein, a corresponding DM-RS (/PTRS) transmission resource may be configured to be a resource corresponding to an AP number scheduled in a predetermined rule.

In other words, although only one of information about an AP used actually for NR-PUSCH transmission and information about the position of a subcarrier carrying a DM-RS (/PTRS) is provided to the UE, the UE may acquire the two pieces of information. Therefore, a gain may be achieved in terms of signaling overhead during UL scheduling.

For example, if an AP used actually for NR-PUSCH transmission is indicated as #1 by DCI, the UE may transmit a DM-RS on subcarriers #0, #4 and #8 through AP #1 as pre-agreed, without additional signaling.

However, if both of UE1 and UE2 are scheduled to transmit NR-PUSCHs through AP #1 in MU-MIMO UL transmission, the two UEs transmit DM-RSs on the same subcarrier, thereby degrading channel estimation performance. To avoid the problem, scheduling restriction may result.

As a solution to the above problem, the present invention proposes a method of transmitting a DM-RS/NR-PUSCH and a method of indicating a transmission position for the DM-RS/NR-PUSCH. While a configuration of the present invention is described below, focusing on the DM-RS, for the convenience, the configuration may also be applied to the PTRS.

3.3.1. An AP Used for NR-PUSCH Transmission and the Position of a Resource Carrying a DM-RS are Indicated Separately by DCI (or Physical-Layer Signaling).

(1) An AP Used for NR-PUSCH Transmission and the Position of a Resource Carrying the DM-RS are Indicated in Respective Bitmaps.

If there are four APs, and a DM-RS is transmitted on a different subcarrier through each AP as illustrated in FIG. 9, an AP indication and the position of a resource carrying the DM-RS may be signaled in a total of 8 bits, 4 bits for each. For example, if APs used in the NR-PUSCH transmission are indicated as "1100" and the positions of resources carrying the DM-RS are indicated as "0011", the UE transmits an NR-PUSCH through APs #1 and #2, and transmits the DM-RS on subcarriers #2, #6, and #10 through AP #1 and on subcarriers #3, #7 and #11 through AP #2.

(2) Only the Positions of Resources Carrying a DM-RS are Indicated by a Bitmap, and the Offset of a Starting AP Number is Indicated.

For example, the positions of resources carrying the DM-RS may be signaled as "1010" and the offset may be signaled as "1". An offset value of "0" may indicate APs #1 and #2, an offset value of "1" may indicate APs #2 and #3, and an offset value of "2" may indicate APs #3 and #4. In the above example, therefore, the UE may transmit the DM-RS through APs #2 and #3, specifically on subcarriers #0, #4 and #8 through AP #2, and on subcarriers #2, #6 and #10 through AP #3.

(3) A Set of APs Used for NR-PUSCH Transmission and/or a Set of the Positions of Resources Carrying a DM-RS are Limited to Predetermined Candidates.

Signaling two pieces of information in bitmaps as in the foregoing (1) may lead to large signaling overhead. In this context, a method of reducing signaling overhead by limiting candidate sets which may be indicated by each bitmap may be considered.

For example, sets of APs available for NR-PUSCH transmission may be limited to {1}, {2}, {3}, {4}, {1, 2}, {3, 4}, and {1, 2, 3, 4}, and sets of the positions of resources carrying the DM-RS may be limited to {D1}, {D2}, {D3}, {D4}, {D1, D2}, {D3, D4}, and {D1, D2, D3, D4}. In this case, 3 bits is required to represent each piece of information, and thus the two pieces of information may be signaled in a total of 6 bits. Furthermore, the two pieces of information may be jointly encoded, thereby reducing signaling overhead. More specifically, the number of APs linked to an AP set may be regarded as equal to that of the positions of resources carrying the DM-RS. In this case, the information may be represented as a total of 21 (=$4^2+2^2+1$) states, and thus signaled by a 5-bit field in DCI.

(4) Antenna Selection Information Such as Information about APs Used for NR-PUSCH Transmission (or Information about the Positions of Resources Carrying a DM-RS) is Transmitted by Using a Codebook (or a Precoding Matrix).

For example, when the gNB indicates TxD transmission through two APs selected from among APs #1, #2, #3, and #4, if a codebook of $$\frac{1}{\sqrt{2}} \begin{bmatrix} 1 \\ 0 \\ 1 \\ 0 \end{bmatrix}$$

is signaled, the UE may attempt to transmit an NR-PUSCH in TxD through APs #1 and #3.

3.3.2. A Different Mapping Relationship Between APs Used for NR-PUSCH Transmission and the Positions of Resources Carrying a DM-RS is Configured for Each UE by Higher-Layer Signaling (e.g., RRC Signaling).

For example, in the case where UE1 is configured to transmit a DM-RS in resources D1, D2, D3, and D4 (in FIG. 9) through APs #1, #2, #3, and #4, and UE2 is configured to transmit a DM-RS in resources D4, D3, D2, and D1 through APs #1, #2, #3, and #4, even though the gNB indicates MU-MIMO UL transmission through AP #1 to each UE, the DM-RS of each UE may be transmitted in a different frequency resource.

The configurations described in section 3.3.1. and section 3.3.2. may also be applied in the same rule to the PTRS (without additional signaling). Or, an AP used for NR-PUSCH transmission, the position of a resource carrying a DM-RS, and the position of a resource carrying a PTRS may be indicated separately by additional signaling other than the DM-RS.

In the configurations described in section 3.3.1. and section 3.3.2., if the number of APs reported by the UE or the number of APs actually indicated for transmission is N, it may be allowed to indicate DM-RS/PTRS transmission through more than N APs. For example, when N=2, DM-RS transmission through 4 APs may be indicated. In this case, the UE may transmit the DM-RS on all subcarriers in symbol #2 (according to a preset rule).

3.3.3. Method of Using Resources Carrying No DM-RS for NR-PUSCH Transmission

Meanwhile, if a DM-RS is transmitted in a different resource through each AP as illustrated in FIG. 9, some resources may not be used for either DM-RS transmission or NR-PUSCH transmission according to APs used by the UE. For example, if one UE transmits an NR-PUSCH only through one AP, three subcarriers out of four subcarriers of symbol #2 in transmission resource areas of the UE may not be used for transmitting a specific signal. In this context, a specific method of allowing use of corresponding resources for an NR-PUSCH in order to efficiently use radio resources will be described in this section.

(1) Information about Subcarriers Carrying No DM-RS is Indicated by DCI (or Physical-Layer Signaling).

If a DM-RS is transmitted on a different subcarrier through each AP as illustrated in FIG. 9, the gNB may signal information about subcarriers that do not carry the DM-RS to a UE by a 4-bit bitmap. For example, if "0011" is signaled to the UE, the UE may transmit the NR-PUSCH on subcarriers #2, #3, #6, #7, #10, and #11 in symbol #2.

(2) Resources that do not Carry a DM-RS are Used in a Different Manner According to a Transmission Scheme of a UE.

If it is assumed that a TxD is not supposed to operate in MU-MIMO, it may be determined implicitly whether the NR-PUSCH is mapped to a subcarrier that does not carry the DM-RS (simply without additional signaling). For example, it may be configured that a UE scheduled with TxD transmits an NR-PUSCH by mapping the NR-PUSCH to a subcarrier unused for DM-RS transmission, and a UE scheduled with a transmission scheme other than TxD does not map/transmit the NR-PUSCH to/on a subcarrier unused for DM-RS transmission. Herein, it may be indicated implicitly whether the DM-RS is to be transmitted by existing signaling.

(3) Method of Indicating to a UE Only Whether Scheduling for the UE is "Single UE Scheduling" or Whether "the NR-PUSCH is Mapped/Transmitted to/on a Subcarrier Unused for DM-RS Transmission" Irrespective of an NR-PUSCH Transmission Scheme (e.g., Single AP Transmission, TxD, or SM).

In this case, if "single UE scheduling" or "mapping/transmitting the NR-PUSCH to/on subcarrier unused for DM-RS transmission" is indicated to the UE, the UE may map/transmit the NR-PUSCH to/on a subcarrier unused for DM-RS transmission. On the contrary, if "non-single UE scheduling" or "non-mapping/non-transmission of the NR-PUSCH to/on a subcarrier unused for DM-RS transmission" is indicated to the UE, the UE may not map/transmit the NR-PUSCH to/on a subcarrier unused for DM-RS transmission.

(4) Power Level Applied to NR-PUSCH Transmission Method

In the present invention, a UE may attempt to transmit an NR-PUSCH on a subcarrier unused for DM-RS transmission irrespective of an NR-PUSCH transmission method (e.g., single AP transmission, TxD, or SM). Or the UE may be configured to operate in the above manner by RRC signaling.

Herein, if the NR-PUSCH is transmitted on subcarriers available for DM-RS transmission, there may be a limit on transmission power and/or an MCS. This is because other UEs may potentially transmit DM-RSs on the subcarriers.

For example, the UE may transmit the NR-PUSCH with power lower than NR-PUSCH power by P_offset (preset or configured by higher-layer/physical-layer signaling). If there is a lower bound on the NR-PUSCH transmission power, and the power value to which P_offset has been applied is lower than the lower bound, the UE may drop the NR-PUSCH transmission or transmit the NR-PUSCH with power corresponding to the lower bound in a corresponding symbol.

In another example, a default modulation order for a symbol available for DM-RS transmission may be set to 2 (binary phase shift keying (BPSK)) (or a specific I_mcs value) (by higher-layer/physical-layer signaling).

(5) Information Indicating the Position of the Starting Symbol of an NR-PUSCH Implicitly Indicates Whether "the NR-PUSCH is Transmitted on a Subcarrier Unused for DM-RS Transmission".

If the position of the starting symbol of the NR-PUSCH is signaled, NR-PUSCH transmission may be allowed on a subcarrier unused for DM-RS transmission from the position of a symbol configured with DM-RS transmission to the position of the starting symbol of the NR-PUSCH. For example, if the starting symbol of the NR-PUSCH is indicated as symbol #2, and DM-RS transmission is indicated only for subcarriers corresponding to D1 and D2 in the frame structure illustrated in FIG. 9, the UE may attempt to transmit the NR-PUSCH on the other subcarriers corresponding to D3 and D4.

The configuration described in section 3.3.3. may also be applied in the same manner to the PTRS (without additional signaling). By additional signaling other than the DM-RS, it may be indicated separately whether the NR-PUSCH is to be mapped/transmitted to/on a subcarrier unused for PTRS transmission (by physical-layer or higher-layer signaling).

3.3.4. It is Configured Whether a Signal Such as a PTRS or a DM-RS is Additionally Transmitted.

In consideration of high mobility, BS-UE frequency/satellite/time tracking, or phase noise of an oscillator, it may be necessary to additionally transmit a signal such as a PTRS or a DM-RS to help with channel estimation. As the signal is transmitted more times, channel estimation performance is improved, thereby increasing signaling overhead and degrading the transmission performance of PUSCH data. That is, there is a tradeoff between the transmission performance of PUSCH data and signaling overhead. In this context, it may be regulated that whether a corresponding signal is to be transmitted additionally (and/or information about the positions/density of resources to carry the signal and/or the sequence of the signal) is configurable by higher-layer signaling or L1 signaling.

However, it may also be regulated that when the UE attempts initial access on a specific subcarrier, whether the signal (i.e., the PTRS and/or the additional DM-RS) is transmitted (and/or information about the positions/density of resources to carry the signal and/or the sequence of the signal) is also configurable for a message 3 PUSCH (i.e., a PUSCH scheduled by a UL grant in a random access response (RAR) transmitted in response to an RACH transmission) in an RACH procedure. This signal configuration may be indicated by a system information block (SIB) or an RAR message.

Or, the configuration of the corresponding signal (i.e., the PTRS and/or the additional DM-RS) (e.g., information indicating transmission or non-transmission and/or information about the positions/density of resources to carry the signal and/or the sequence of the signal) may be indicated implicitly, not explicitly. For example, when transmitting the message 3 PUSCH in a specific frequency band (e.g., above 6 GHz), the UE may always transmit the PTRS (or the additional DM-RS). In another example, in the case where a signal is transmitted by analog beam sweeping, when transmitting the message 3 PUSCH in a specific frequency band (e.g., above 6 GHz), the UE may always transmit the PTRS (or the additional DM-RS).

3.3.5. PTRS Transmission Method for Supporting MU-MIMO Between Cyclic Prefix (CP)-OFDM UE and DFT Spread OFDM UE (DFT-s-OFDM UE)

To support MU-MIMO between a CP-OFDM UE and a DFT-s-OFDM UE (or between DFT-s-OFDM UEs), it may be configured that the PTRS is mapped to all subcarriers in a specific symbol (like the DM-RS). Or, the UE may puncture an NR-PUSCH in REs to which the PTRS is to be mapped after performing DFT on the NR-PUSCH, or performing DFT with the number of REs except for the REs to which the PTRS is to be mapped, at the expense of the PAPR of DFT-s-OFDM.

If multiplexing between the NR-PUSCH and the PTRS is supported at the front end of DFT to maintain a low PAPR for the DFT-s-OFDM UE, it may be indicated dynamically by a UL grant whether the PTRS mapping is performed before or after DFT.

Specifically, when MU-MIMO is scheduled between a CP-OFDM UE and a DFT-s-OFDM UE (or between DFT-s-OFDM UEs), the gNB may indicate post-DFT PTRS mapping, and when an NR-PUSCH is scheduled only for the DFT-s-OFDM UE, the gNB may indicate pre-DFT PTRS mapping.

Now, a description will be given of a method of transmitting a UL signal to a BS by a UE among the foregoing various signal transmission and reception methods.

Specifically, when a UE according to the present invention transmits a UL signal to a BS, the UE may transmit the UL signal by using a different beamforming (i.e., precoder cycling) method for each predetermined resource area carrying the UL signal.

To this end, the UE transmits the UL signal by applying a different beamforming scheme to each of resource areas divided according to a predetermined rule in one or more symbols of one slot including a plurality of symbols.

The UL signal may be a PUCCH or PUSCH. While the following description is given in the context of the PUCCH by way of example, the same thing may apply to the PUSCH as another exemplary UL signal.

Further, applying a different beamforming scheme to each of resource areas divided according to the predetermined rule by the UE may mean that the UE applies one or more of digital beamforming, analog beamforming, and hybrid beamforming differently to the respective resource areas.

For example, the UL signal may be transmitted in a 1-symbol PUCCH structure. Then, the UE may transmit the 1-symbol PUCCH by applying a different beamforming scheme to each of the resource areas divided according to the predetermined rule.

For this purpose, the UE may receive information about the predetermined rule from the BS. The information about the predetermined rule may include one of information about the size of frequency resources to which the same beamforming scheme is applied, and information about a frequency resource range to which the same beamforming scheme is applied.

Further, the UE may transmit the 1-symbol PUCCH by distributedly mapping the 1-symbol PUCCH in the frequency domain within one symbol. Herein, the UE may transmit the 1-symbol PUCCH by applying a different beamforming scheme to each set of contiguous frequency resources or each set of contiguous resources of the same comb index in the one symbol carrying the 1-symbol PUCCH.

In another example, the UL signal may be transmitted in a 2-symbol PUCCH structure.

Then, the UE may transmit the 2-symbol PUCCH by applying a different beamforming scheme to each of symbols carrying the 2-symbol PUCCH.

In this case, the UE may transmit the 2-symbol PUCCH by applying different beamforming schemes to a symbol carrying an RS and a symbol without an RS among the symbols carrying the 2-symbol PUCCH.

Or, the UE may transmit the 2-symbol PUCCH by applying a different beamforming scheme to each frequency resource area of a predetermined size in two symbols carrying the 2-symbol PUCCH.

In another example, the UL signal may be transmitted in a PUCCH structure exceeding 2 symbols. This PUCCH structure will be referred to as a long PUCCH.

In this case, the UE may transmit the long PUCCH by applying different beamforming schemes to a symbol carrying an RS and a symbol without an RS among symbols carrying the long PUCCH.

Or, when the UE transmits the long PUCCH by frequency hopping, the UE may transmit the long PUCCH by applying a different beamforming scheme to each hop in more than two symbols carrying the long PUCCH.

Since examples of the above proposed methods may be included as one of methods of implementing the present invention, it is apparent that the examples may be regarded as proposed methods. Further, the foregoing proposed methods may be implemented independently, or some of the methods may be implemented in combination (or merged). Further, it may be regulated that information indicating whether the proposed methods are applied (or information about the rules of the proposed methods) is indicated to a UE by a pre-defined signal (or a physical-layer or higher-layer signal) by an eNB.

4. Device Configuration

Figure 18:
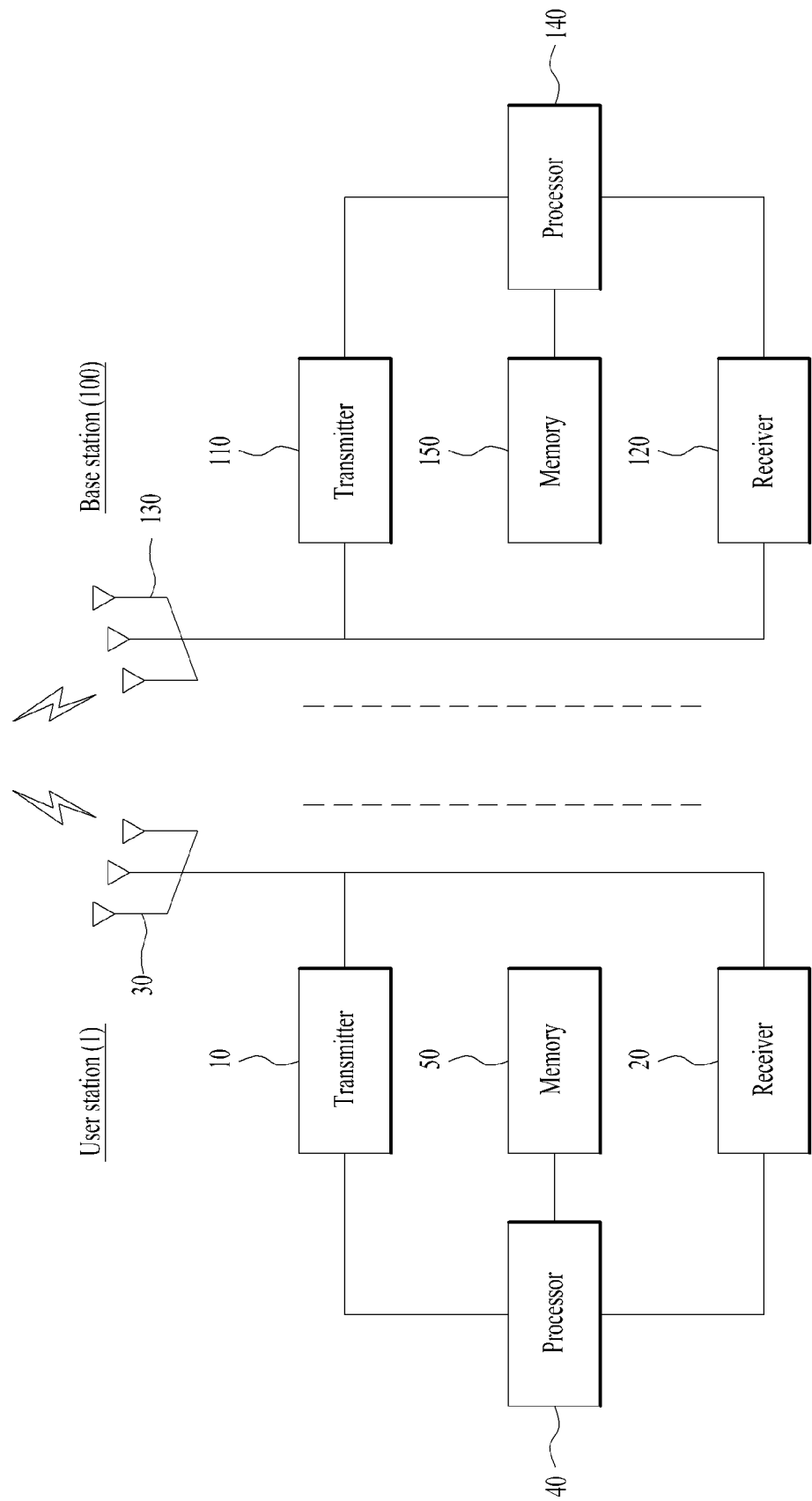
FIG. 18 is a block diagram of a user equipment (UE) and a base station (BS) for implementing the proposed embodiments.

FIG. 18 is a diagram illustrating configurations of a UE and a base station capable of being implemented by the embodiments proposed in the present invention. The UE and the base station illustrated in FIG. 18 operate to implement the embodiments of the foregoing signal transmission and reception methods between a UE and a BS.

A UE 1 may act as a transmission end on a UL and as a reception end on a DL. A base station (eNB or new generation NodeB (gNB)) 100 may act as a reception end on a UL and as a transmission end on a DL.

That is, each of the UE and the base station may include a Transmitter (Tx) 10 or 110 and a Receiver (Rx) 20 or 120, for controlling transmission and reception of information, data, and/or messages, and an antenna 30 or 130 for transmitting and receiving information, data, and/or messages.

Each of the UE and the base station may further include a processor 40 or 140 for implementing the afore-described embodiments of the present disclosure and a memory 50 or 150 for temporarily or permanently storing operations of the processor 40 or 140.

The UE 1 having the above configuration may transmit a UL signal (e.g., NR-PUCCH or NR-PUSCH) in the following manner.

Specifically, the UE 1 may transmit the UL signal, through the transmitter 10, by applying a different beamforming scheme to each of resource areas divided according to a predetermined rule in one or more symbols of one slot including a plurality of symbols.

Various rules may be available as the predetermined rule, which divide a time/frequency resource area carrying the UL signal into resource areas to which different beamforming schemes are applied.

The Tx and Rx of the UE and the base station may perform a packet modulation/demodulation function for data transmission, a high-speed packet channel coding function, OFDM packet scheduling, TDD packet scheduling, and/or channelization. Each of the UE and the base station of FIG. 18 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present disclosure may be achieved by various means, for example, hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

The present disclosure is applicable to various wireless access systems including a 3GPP system, and/or a 3GPP2 system. Besides these wireless access systems, the embodiments of the present disclosure are applicable to all technical fields in which the wireless access systems find their applications. Moreover, the proposed method can also be applied to mmWave communication using an ultra-high frequency band.

The invention claimed is:

1. A method of transmitting an uplink signal by a user equipment (UE) in a wireless communication system, the method comprising:
   obtaining first information related to at least one demodulation reference signal (DMRS) port index for a physical uplink shared channel (PUSCH);
   obtaining second information related to whether the PUSCH is transmitted in frequency resources that are not used for DMRS transmission in a time interval for a DMRS transmission reserved for the UE; and
   transmitting the uplink signal comprising the PUSCH and the DMRS via uplink resources determined based on the first and second information,
   wherein the frequency resources for the DMRS transmission are determined based on the at least one DMRS port index, and
   wherein the frequency resources for the PUSCH in the time interval for the DMRS transmission reserved for the UE are determined based on the second information, and
   wherein based on scheduling for the uplink signal being for multiple UEs, the second information informs the UE that the PUSCH is not transmitted in the frequency resources that are not used for the DMRS transmission in the time interval for the DMRS transmission reserved for the UE.

2. The method of claim 1, wherein the first information and the second information are obtained via downlink control information (DCI).

3. The method of claim 1, wherein frequency resources for a respective DMRS port index are pre-configured.

4. The method of claim 1, wherein the time interval for the DMRS transmission reserved for the UE has a length of one orthogonal frequency division multiplexing (OFDM) symbol.

5. A user equipment (UE) for transmitting an uplink signal in a wireless communication system, the UE comprising:
   a transmitter;
   a receiver; and
   a processor that controls the transmitter and the receiver, wherein the processor is configured to:
   obtain first information related to at least one demodulation reference signal (DMRS) port index for a physical uplink shared channel (PUSCH);

obtain second information related to whether the PUSCH is transmitted in frequency resources that are not used for DMRS transmission in a time interval for a DMRS transmission reserved for the UE; and control the transmitter to transmit the uplink signal comprising the PUSCH and the DMRS via uplink resources determined based on the first and second information, wherein the frequency resources for the DMRS transmission are determined based on the at least one DMRS port index, and wherein the frequency resources for the PUSCH in the time interval for the DMRS transmission reserved for the UE are determined based on the second information, and wherein based on scheduling for the uplink signal being for multiple UEs, the second information informs the UE that the PUSCH is not transmitted in the frequency resources that are not used for the DMRS transmission in the time interval for the DMRS transmission reserved for the UE.

6. The UE of claim 5, wherein the first information and the second information are obtained via downlink control information (DCI).

7. The UE of claim 5, wherein frequency resources for a respective DMRS port index are pre-configured.

8. The UE of claim 5, wherein the time interval for the DMRS transmission reserved for the UE has a length of one orthogonal frequency division multiplexing (OFDM) symbol.

9. A base station for receiving an uplink signal in a wireless communication system, the base station comprising:
- a transmitter;
- a receiver; and
- a processor that controls the transmitter and the receiver, wherein the processor is configured to:
  control the transmitter to transmit to a user equipment, first and second information, wherein the first information is related to at least one demodulation reference signal (DMRS) port index for a physical uplink shared channel (PUSCH), wherein the second information related to whether the PUSCH is transmitted in frequency resources that are not used for DMRS transmission in a time interval for a DMRS transmission reserved for the UE; and control the receiver to receive from the user equipment, the uplink signal comprising the PUSCH and the DMRS via uplink resources determined based on the first and second information, wherein the frequency resources for the DMRS transmission are determined based on the at least one DMRS port index, and wherein the frequency resources for the PUSCH in the time interval for the DMRS transmission reserved for the UE are determined based on the second information, and wherein based on scheduling for the uplink signal being for multiple UEs, the second information informs the UE that the PUSCH is not transmitted in the frequency resources that are not used for the DMRS transmission in the time interval for the DMRS transmission reserved for the UE.

10. The method of claim 1, based on the scheduling for the uplink being for the UE only, the second information informs the UE that the PUSCH is transmitted in the frequency resources that are not used for the DMRS transmission in the time interval for the DMRS transmission reserved for the UE.

11. The UE of claim 5, based on the scheduling for the uplink being for the UE only, the second information informs the UE that the PUSCH is transmitted in the frequency resources that are not used for the DMRS transmission in the time interval for the DMRS transmission reserved for the UE.

* * * * *